(12) United States Patent
Mao

(10) Patent No.: US 9,370,731 B2
(45) Date of Patent: *Jun. 21, 2016

(54) SINTERED POROUS PLASTIC LIQUID BARRIER MEDIA AND APPLICATIONS THEREOF

(71) Applicant: Porex Corporation, Fairburn, GA (US)

(72) Inventor: Guoqiang Mao, Peachtree City, GA (US)

(73) Assignee: Porex Corporation, Fairburn, GA (US)

( * ) Notice: Subject to any disclaimer, the term of this patent is extended or adjusted under 35 U.S.C. 154(b) by 135 days.

This patent is subject to a terminal disclaimer.

(21) Appl. No.: 14/224,318

(22) Filed: Mar. 25, 2014

(65) Prior Publication Data

US 2014/0217032 A1 Aug. 7, 2014

Related U.S. Application Data

(63) Continuation of application No. 13/488,522, filed on Jun. 5, 2012, now Pat. No. 8,690,981.

(60) Provisional application No. 61/497,218, filed on Jun. 15, 2011.

(51) Int. Cl.
  *B01D 15/20* (2006.01)
  *B01D 39/16* (2006.01)
  (Continued)

(52) U.S. Cl.
  CPC ............... *B01D 15/20* (2013.01); *B01D 39/16* (2013.01); *B01D 39/1661* (2013.01);
  (Continued)

(58) Field of Classification Search
  CPC .... B01D 39/1661; B01D 39/16; B01D 15/20; B01D 2239/086; B01D 2239/1208; B01D 2239/1216; C08L 33/02; C08L 23/06; C08L 27/16; C08L 2207/068; C08L 1/286; B01J 20/261; B01J 20/3007; B01J 2220/45; B01J 2220/49; B01J 2220/64; B01J 2220/66; B01J 2220/68; C08J 9/24; C08J 2323/02; C08J 2400/14; C08J 2401/02; C08J 2433/02
  USPC ............. 96/108, 117.5, 153; 95/90, 116, 141; 422/400; 55/523; 210/502.1, 510.1; 264/45.3, 125, 126
  See application file for complete search history.

(56) References Cited

U.S. PATENT DOCUMENTS 3,287,807 A 11/1966 Cornelis
3,689,634 A 9/1972 Kliment et al.
(Continued)

FOREIGN PATENT DOCUMENTS

CN 101528824 9/2009
CN ZL200780039008.7 5/2012
(Continued)

OTHER PUBLICATIONS

"Abstract of JP01171930 (Kinyosha KK)", Database EPODOC, XP-002463792, Jul. 6, 1989.
(Continued)

*Primary Examiner* — Frank Lawrence
(74) *Attorney, Agent, or Firm* — Kilpatrick Townsend & Stockton LLP

(57) ABSTRACT

This application discloses porous self-sealing media comprising a sintered mixture of an absorbent material and a thermoplastic. The self-sealing media block passage of organic solvents or organic solvents in aqueous mixtures, wherein the organic solvents are at concentrations greater than about 40%. The self-sealing media also block acidic solutions. The self-sealing media are useful in a variety of applications such as a pipette tip filter, in line filter, vent, non-mechanical check valve, safety valve, and suction canister.

22 Claims, 7 Drawing Sheets

(51) Int. Cl.

| | |
|---|---|
| *C08J 9/24* | (2006.01) |
| *C08L 23/06* | (2006.01) |
| *C08L 27/16* | (2006.01) |
| *C08L 33/02* | (2006.01) |
| *B01J 20/26* | (2006.01) |
| *B01J 20/30* | (2006.01) |

(52) U.S. Cl.
CPC ........... *B01J 20/261* (2013.01); *B01J 20/3007* (2013.01); *C08J 9/24* (2013.01); *C08L 23/06* (2013.01); *C08L 27/16* (2013.01); *C08L 33/02* (2013.01); *B01D 2239/086* (2013.01); *B01D 2239/1208* (2013.01); *B01D 2239/1216* (2013.01); *B01J 2220/445* (2013.01); *B01J 2220/49* (2013.01); *B01J 2220/64* (2013.01); *B01J 2220/66* (2013.01); *B01J 2220/68* (2013.01); *C08J 2323/02* (2013.01); *C08J 2400/14* (2013.01); *C08J 2401/02* (2013.01); *C08J 2433/02* (2013.01); *C08L 2207/068* (2013.01)

(56) References Cited

U.S. PATENT DOCUMENTS

| | | |
|---|---|---|
| 3,939,105 A | 2/1976 | Jones et al. |
| 3,975,350 A | 8/1976 | Hudgin et al. |
| 4,220,152 A | 9/1980 | Dresback |
| 4,220,153 A | 9/1980 | Dresback |
| 4,306,033 A | 12/1981 | Morita et al. |
| 4,340,067 A | 7/1982 | Rattenborg |
| 4,443,515 A | 4/1984 | Atlas |
| 4,473,665 A | 9/1984 | Martini-Vvedensky et al. |
| 4,516,679 A | 5/1985 | Simpson et al. |
| 4,668,564 A | 5/1987 | Orchard |
| 4,724,114 A | 2/1988 | McFarland et al. |
| 4,755,178 A | 7/1988 | Insley et al. |
| 4,769,026 A | 9/1988 | Strung |
| 4,820,577 A | 4/1989 | Morman et al. |
| 4,822,546 A | 4/1989 | Lohkamp |
| 4,924,860 A | 5/1990 | Larsen et al. |
| 4,999,164 A | 3/1991 | Puchinger et al. |
| 5,064,653 A | 11/1991 | Sessions et al. |
| 5,125,415 A | 6/1992 | Bell |
| 5,147,646 A | 9/1992 | Graham |
| 5,156,811 A | 10/1992 | White |
| 5,160,674 A | 11/1992 | Colton et al. |
| 5,175,046 A | 12/1992 | Nguyen |
| 5,232,669 A | 8/1993 | Pardinas |
| 5,259,956 A | 11/1993 | Mercer et al. |
| 5,266,325 A | 11/1993 | Kuzma et al. |
| 5,310,525 A | 5/1994 | Churchouse et al. |
| 5,320,905 A | 6/1994 | Vaughn et al. |
| 5,364,595 A | 11/1994 | Smith |
| 5,435,713 A | 7/1995 | Yamasaki et al. |
| 5,501,945 A | 3/1996 | Kanakkanatt |
| 5,593,702 A | 1/1997 | Harris et al. |
| 5,599,562 A | 2/1997 | Harris et al. |
| 5,607,550 A | 3/1997 | Akers |
| 5,620,427 A | 4/1997 | Werschmidt et al. |
| 5,623,012 A | 4/1997 | Hwo |
| 5,679,380 A | 10/1997 | Munz et al. |
| 5,750,585 A | 5/1998 | Park et al. |
| 5,755,709 A | 5/1998 | Cuppy |
| 5,770,086 A | 6/1998 | Indriksons et al. |
| 5,777,060 A | 7/1998 | Van Antwerp |
| 5,786,439 A | 7/1998 | Van Antwerp et al. |
| 5,797,347 A | 8/1998 | Ochi |
| 5,800,372 A | 9/1998 | Bell et al. |
| 5,824,328 A | 10/1998 | Levy |
| 5,830,185 A | 11/1998 | Block, Jr. |
| 5,836,929 A | 11/1998 | Bewick-Sonntag et al. |
| 5,851,229 A | 12/1998 | Lentz et al. |
| 5,851,491 A | 12/1998 | Moulton |
| 5,906,631 A | 5/1999 | Imran |
| 5,939,086 A | 8/1999 | Levy |
| 5,998,032 A | 12/1999 | Hansen et al. |
| 6,030,558 A | 2/2000 | Smith et al. |
| 6,110,617 A | 8/2000 | Feres |
| 6,123,905 A | 9/2000 | Torti et al. |
| 6,171,290 B1 | 1/2001 | Boisse et al. |
| 6,258,276 B1 | 7/2001 | Mika et al. |
| 6,358,569 B1 | 3/2002 | Badyal et al. |
| 6,638,610 B1 | 10/2003 | Yao |
| 7,743,642 B2 | 6/2010 | Chiba et al. |
| 8,141,717 B2 | 3/2012 | Wingo et al. |
| 8,187,534 B2 | 5/2012 | Mao |
| 8,690,981 B2 * | 4/2014 | Mao ............................... 55/523 |
| 2003/0099576 A1 | 5/2003 | Li et al. |
| 2003/0211799 A1 | 11/2003 | Yao et al. |
| 2004/0052689 A1 | 3/2004 | Yao |
| 2005/0109683 A1 | 5/2005 | Joyce et al. |
| 2005/0273019 A1 | 12/2005 | Conway et al. |
| 2005/0283093 A1 | 12/2005 | Conway et al. |
| 2006/0018800 A1 | 1/2006 | Slowey et al. |
| 2006/0177352 A1 | 8/2006 | Ziegmann et al. |
| 2008/0159912 A1 | 7/2008 | Dantan et al. |
| 2008/0197065 A1 | 8/2008 | Wingo et al. |
| 2008/0199363 A1 * | 8/2008 | Mao ............................ 422/100 |
| 2012/0318139 A1 | 12/2012 | Mao |

FOREIGN PATENT DOCUMENTS

| | | |
|---|---|---|
| DE | 10157551 | 6/2003 |
| EP | 0264704 | 4/1988 |
| EP | 0301753 | 2/1989 |
| EP | 0599587 | 6/1994 |
| EP | 1335960 | 8/2003 |
| EP | 1688181 | 8/2006 |
| EP | 2118182 | 11/2009 |
| EP | 2059556 | 10/2011 |
| GB | 1592855 | 7/1981 |
| IN | 254740 | 12/2012 |
| JP | 54111915 | 9/1979 |
| JP | 57064537 | 4/1982 |
| JP | 61283634 | 12/1986 |
| JP | 62225325 | 10/1987 |
| JP | 63185457 | 8/1988 |
| JP | 1165024 | 6/1989 |
| JP | 02117801 | 5/1990 |
| JP | 3197097 | 8/1991 |
| JP | 06226900 | 8/1994 |
| JP | 09003236 | 7/1997 |
| JP | 10323531 | 12/1998 |
| JP | 11071930 | 3/1999 |
| JP | 0024428 | 1/2000 |
| JP | 2004331855 | 11/2004 |
| JP | 2010501664 | 1/2010 |
| JP | 2010518404 | 5/2010 |
| JP | 5063696 | 8/2012 |
| JP | 20050192536 | 9/2015 |
| MX | 2009001794 | 7/2009 |
| MX | 298829 | 5/2012 |
| MY | 148625 | 5/2013 |
| WO | 8700439 | 1/1987 |
| WO | 9009230 | 8/1990 |
| WO | 9606643 | 3/1996 |
| WO | 9740870 | 11/1997 |
| WO | 9831465 | 7/1998 |
| WO | 9922861 | 5/1999 |
| WO | 0106047 A1 | 1/2001 |
| WO | 0236708 | 5/2002 |
| WO | 2005053821 | 6/2005 |
| WO | 2006097481 | 9/2006 |
| WO | 2008021539 | 2/2008 |
| WO | 2008100500 | 8/2008 |
| WO | 2010120977 | 10/2010 |
| WO | 2012173812 | 12/2012 |

OTHER PUBLICATIONS

"Abstract of JP03197097 (Pentel KK)", Database WPI Week 199141, XP-002463795, AN-1991-298561, Aug. 28, 1991.

(56) References Cited

OTHER PUBLICATIONS

"Abstract of JP2000024428 (Mitsubishi Plastics Ind)", Database WPI Week 200016, XP-002463796, AN-2000-175322, Jan. 25, 2000.
"Abstract of JP2004331855 (Toppan Printing Co.)", Database WPI Week 200401, XP-002485448, AN-2005-002909, Nov. 25, 2004.
"Abstract of JP54111915 (Fuji Kagaku Shikogyo)", Database WPI, Section Ch, Week 197941, Class A97, AN-1979-74332B, XP-002463794, Sep. 1, 1979.
"Abstract of JP57064537 (Showa Gum KK)", Database WPI, Section Ch, Week 198221, XP-002463797, Class A18, AN-1982-42838E, Apr. 19, 1982.
"Abstract of JP62225325 (Bando Chem Ind)", Database WPI Week 198745, AN-1987-317572, XP-002463793, Oct. 3, 1987.
"Chinese Patent Application No. CN200780039008.7, Response to Office Action", Nov. 1, 2011.
EP01992750.8 Office Action Received Mar. 28, 2008, 4 Pages.
EP01992750.8 Office Action Received Jun. 8, 2006, 3 Pages.
"Indian Patent Application No. IN729/KOLNP/2009, Office Action Response", May 22, 2012.
"Japanese Patent Application No. 2009-549607", Notice of Decision to Grant a Patent, May 8, 2012.
"JP 10-323531; English Abstract from Patent Abstracts of Japan and computer translation by Japanese Patent Office".
JP10323531A, Derwent—English abstract.
JP41165024A, Japan Patent Office (JPO) abstract.
PCT/US2001/047056 International Search Report dated Jul. 24, 2002.
PCT/US2007/018355 International Search Report and Written Opinion mailed Feb. 4, 2008.
PCT/US2008/001838 International Preliminary Report on Patentability dated Aug. 19, 2009.
PCT/US2008/001838 International Search Report and Written Opinion mailed Aug. 26, 2008.
PCT/US2008/001838 Invitation to Pay Fees and Partial Search Report mailed Jul. 7, 2008.
U.S. Appl. No. 09/699,364, Final Office Action, Jan. 24, 2007.
U.S. Appl. No. 09/699,364, Final Office Action, Jun. 23, 2008.
U.S. Appl. No. 09/699,364, Final Office Action, May 20, 2005.
U.S. Appl. No. 09/699,364, Non-Final Office Action, Nov. 20, 2007.
U.S. Appl. No. 09/699,364, Non-Final Office Action, Nov. 1, 2010.
U.S. Appl. No. 10/603,765, Non-Final Office Action, Dec. 29, 2004.
U.S. Appl. No. 11/894,066, Notice of Allowance, Jan. 30, 2012.
U.S. Appl. No. 11/894,066, Office Action dated Apr. 20, 2010.
U.S. Appl. No. 11/894,066, Office Action dated Jul. 27, 2010.
U.S. Appl. No. 12/029,850, Notice of Allowance, Apr. 23, 2012.
U.S. Appl. No. 12/029,850, Office Action, Jun. 10, 2010.
U.S. Appl. No. 12/029,850, Office Action, Dec. 8, 2010.
U.S. Appl. No. 12/029,850, Office Action, Feb. 10, 2012.
U.S. Appl. No. 12/029,850, Office Action Response, Mar. 27, 2012.
12727525.3, "EPO Notice Regarding Amended Claims Due", Jan. 28, 2014.
U.S. Appl. No. 13/488,522, "Notice of Allowance", Jan. 29, 2014.
CN200780039008.7, "First Office Action", mailed Nov. 26, 2010.
CN200780039008.7, "Second Office Action", mailed May 18, 2011.
EP 08725464.5, "First Office Action", mailed Dec. 8, 2010.
EP 08725464.5, "Response to First Office Action", filed Apr. 15, 2011.
EP 08725464.5, "Summons to Attend Oral Hearing", mailed Sep. 23, 2011.
EP01992750.8, "Office Action", Aug. 16, 2007.
EP07811431.1, "First Office Action", mailed Jun. 30, 2009.
EP07811431.1, "Response to First Office Action", filed Nov. 2, 2009.
EP07811431.1, "Response to Second Office Action", filed Mar. 3, 2011.
EP07811431.1, "Rule 71(3) EPC Communication regarding Intent to Grant Application", mailed Apr. 29, 2011.
EP07811431.1, "Second Office Action", mailed Oct. 28, 2010.
EP08725464.5, "Cancellation of Oral Proceedings", mailed Jan. 23, 2012.
EP08725464.5, "Intent to Grant", mailed Mar. 23, 2012.
EP08725464.5, "Response", filed Feb. 22, 2012.
Ichikawa et al., "Superabsortive Polymers", Concise Polymeric Materials Encyclopedia, 1999, pp. 1523-1524.
IN729KOLNP/2009, "First Examination Report", mailed Jan. 23, 2012 (6 pages).
JP2009-525582, "First Office Action", Mar. 13, 2012.
JP2009-525582, "Office Action", Mar. 12, 2012.
Li et al., "Porous self-sealing medium for pipette tips comprises super-absorbent inclusions having average size approximately equal to or greater than average pore size of porous plastic matrix", Derwent-Acc-No. 2002-643231.
MX/A/2009/001794, "Office Action", Nov. 30, 2011.
PCT/US2007/018355, International Preliminary Report on Patentability mailed on Mar. 5, 2009.
PCT/US2012/040837, "International Preliminary Report on Patentability", Jan. 3, 2014.
PCT/US2012/040837, "International Search Report and Written Opinion", Oct. 5, 2012.

* cited by examiner

Sintered porous thermoplastic with absorbent

Sintered porous thermoplastic

FIG. 5A

Sintered porous thermoplastic with absorbent and color change indicator

Sintered porous thermoplastic

FIG. 5B

SINTERED POROUS PLASTIC LIQUID BARRIER MEDIA AND APPLICATIONS THEREOF

CROSS REFERENCE TO RELATED APPLICATIONS

The present application is a continuation application of U.S. patent application Ser. No. 13/488,522, filed Jun. 5, 2012 and issued as U.S. Pat. No. 8,690,981, which claims the benefit of priority to U.S. Provisional Application No. 61/497,218 filed Jun. 15, 2011, both of which are hereby incorporated by reference in their entirety.

FIELD OF THE INVENTION

The present invention provides sintered porous plastic media which are effective in blocking passage of organic solvents, aqueous solutions or organic solvents or acidic solutions.

BACKGROUND

Current commercially available self-sealing pipette tip filters can block aqueous-based solutions containing up to about 40% by volume organic solvent, such as isopropanol (IPA) or dimethylsulfoxide (DMSO), from passing through the filter when the solution contacts the filter during over pipetting. However, these self-sealing pipette tip filters do not block aqueous-based solutions containing organic solvents of more than 40% from passing through the filter when the solution contacts the filter during over pipetting. Accordingly, what is needed are self-sealing pipette tip filters that not only block pure water and water based solutions containing less than 40% organic solvents, but also block solutions that are organic solvents and aqueous mixtures, wherein the organic solvents are at concentrations greater than about 40%. Also needed are self-sealing pipette tip filters that block non-aqueous based polar organic solutions. Also needed are self-sealing pipette tip filters that block pure polar organic solvents.

In addition to self-sealing pipette tip filters, self-sealing media are also useful as non-mechanical check valves to prevent liquid from passing through upon contact, such as in a suction canister. Current non-mechanical check valves have similar compositions as self-sealing pipette tip filters and do not block solutions that contain more than 40% organic solvent and less than 60% of water. There is market need to have non-mechanical valves that not only block pure water and water based solutions containing less than 40% organic solvents, but also block solutions that are organic solvents and aqueous mixtures, wherein the organic solvents are at concentrations greater than about 40%. Commercially available self-sealing media also do not block acidic aqueous solutions or organic acid solutions at low concentrations. Non-mechanical valves are needed that block non-aqueous based polar organic solutions. Also needed are non-mechanical valves that block pure polar organic solvents. What is also needed are self-sealing media that block aqueous solutions of inorganic acids or organic acids at concentrations of at least about 5%.

SUMMARY

The present invention solves these problems by providing sintered porous plastic self-sealing media that block various solvents and solutions thereof. In one embodiment, these sintered porous plastic self-sealing media block organic solvents in aqueous mixtures, wherein the organic solvents are at concentrations greater than about 40%, or between about 40% to about 99%, or between about 40% to about 90%. The present invention also provides self-sealing media that block polar organic solvent solutions that are not aqueous-based, including 100% pure organic solvents. The present invention further provides self-sealing media that block aqueous solutions of inorganic acids or organic acids at concentrations of from about 0% to about 100%. The present invention also provides self-sealing media that block aqueous solutions of surfactants at concentrations ranging from about 0% to about 100%. The present invention also provides self-sealing media that block organic solvents in aqueous mixtures with acids and/or surfactants.

In some embodiments, the porous plastic self-sealing media comprise an absorbent material and a thermoplastic. In a specific embodiment, the absorbent materials are polymeric materials that form high a viscosity solution quickly when contacted by water and polar organic solutions. This definition is different from traditional super-absorbent materials which are generally used for absorbing water. In one embodiment, the absorbent material is polyacrylic acid (PAA). In one embodiment, the PAA is linear PAA with a molecular weight greater than 100 KDa or cross-linked PAA with a linear backbone molecular weight between adjacent crosslinks (Mc) greater than 10 KDa.

The porous self-sealing media may optionally include elastomeric materials and/or color change indicators. The porous self-sealing media may further comprise another absorbent material, CMC or a superabsorbent material.

The porous self-sealing media in embodiments of the present invention are useful in a variety of applications and devices including but not limited to the following: pipette tip filter, in line filter, vent, non-mechanical check valve, safety valve, and suction canister.

These porous self-sealing media that block organic solvents, acids, bases and surfactants help prevent unwanted spills and also contamination and corrosion of devices due to contact with organic solutions, acids and bases.

Self-sealing media in this invention are defined as porous media that allow air and gas to pass through when the media are dry and do not allow air, gas or solutions to pass through when the media contacts aqueous based or organic solvent-based liquid solutions, for example under suction forces or pressure. The suction forces are vacuum or negative pressures. The new organic solvent self-sealing media of the present invention can block inorganic and organic solutions containing organic solvent concentrations of about 40% or greater. The present invention also provides self-sealing media that block aqueous solutions of inorganic acids or organic acids at concentrations of from about 0% to about 100%. These self-sealing media also block passage of solutions containing bases or surfactants. Use of these self-sealing media provides a safer environment for transfer of highly corrosive inorganic acids and organic acids.

BRIEF DESCRIPTION OF THE FIGURES

FIG. 4 illustrates a modified pipette tip 40 which again comprises a hollow, frustoconical or tapering tubular member 42 for securing to a suitable pipette or suction device 49 at one end 44 so as to draw a liquid sample into the pipette through the opposite end 46. A plug member 48 is a porous self-sealing media that blocks organic solvents and is positioned between a chamber above the media 47 and a chamber below the media 45 which is continuous with end 46.

FIG. 5 is a schematic representation of two bilayered structures. In A (top panel) a porous media comprising a sintered porous thermoplastic layer with absorbent is adjacent to a sintered porous thermo plastic layer with no absorbent. In B (bottom panel) a porous media comprising a sintered porous thermoplastic layer with absorbent and a color change indicator is adjacent to a sintered porous thermoplastic layer with no absorbent or color change indicator.

DETAILED DESCRIPTION

Figure 1:
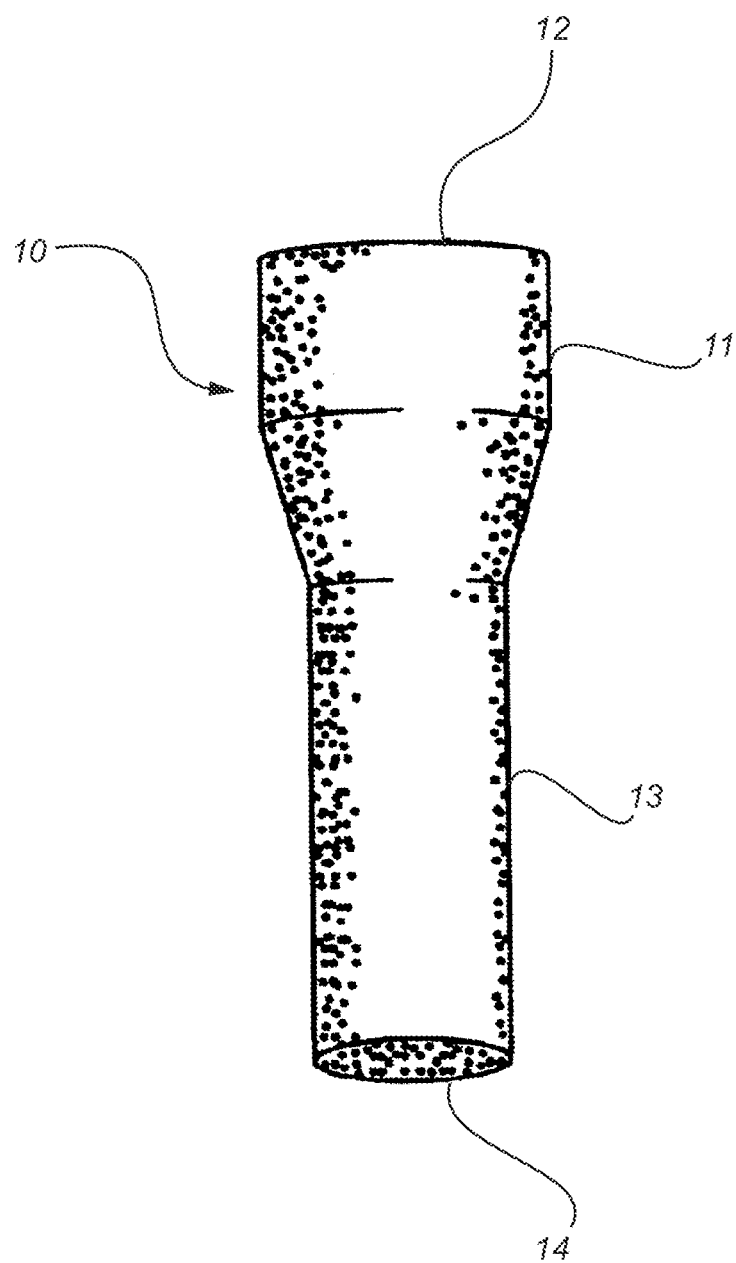
FIG. 1 is a schematic representation of a non-mechanical filter valve 10 comprising a porous self-sealing media that blocks organic solvents which could be used in a suction canister. The filter 10 comprises a first portion 11 having an open end 12 and a second portion 13 having a closed end 14

The present invention solves these problems by providing sintered porous plastic self-sealing media that block various solvents and solutions thereof. In one embodiment, these sintered porous plastic self-sealing media block organic solvents in aqueous mixtures, wherein the organic solvents are at concentrations greater than about 40%, or between about 40% to about 99%, or between about 40% to about 90%. The present invention also provides self-sealing media that block polar organic solvent solutions that are not aqueous-based, including 100% pure organic solvents. The present invention also provides self-sealing media that block aqueous solutions of inorganic acids or organic acids at concentrations of from about 0% to about 100%. The present invention also provides self-sealing media that block aqueous solutions of surfactants at concentrations ranging from about 0% to about 100%. The present invention also provides self-sealing media that block solutions of bases at concentrations ranging from about 0% to about 100%. The present invention also provides self-sealing media that block organic solvents in aqueous mixtures with acids and/or surfactants.

The present invention provides porous self-sealing media that block organic solvents in aqueous mixtures, wherein the organic solvents are at concentrations greater than about 40%, or between about 40% to about 99%, or between about 40% to about 90%, or between about 40% to about 80%, or between about 40% to about 70% (vol %). The present invention also provides porous self-sealing media that block aqueous based polar organic solutions or pure polar organic solvents. The present invention also provides porous self-sealing media that block polar organic solvent solutions that are not aqueous-based, including 100% pure organic solvents. The present invention also provides porous self-sealing media that block aqueous solutions of inorganic acids or organic acids at concentrations of from about 0% to about 100%, 0% to about 90%, 0% to about 80%, 0% to about 70%, 0% to 60%, 0% to 50%, or 0% to 40%, or greater than 5%. The present invention also provides porous self-sealing media that block the passage of aqueous solutions of bases. The present invention also provides porous self-sealing media that block aqueous solutions of surfactants at concentrations of at least about 0% to about 100%.

The self-sealing media of the present invention comprise an absorbent material and a thermoplastic. The term plastic in this application is used interchangeably with the term thermoplastic. In one embodiment, the thermoplastic particles are selected from the group consisting of polyethylene, polypropylene and polyvinylidene fluoride (PVDF). In one embodiment, the polyethylene is high density polyethylene (HDPE), low density polyethylene (LDPE), very high molecular weight polyethylene (VHMWPE), or ultrahigh molecular weight polyethylene (UHMWPE). In one embodiment, the absorbent material is polyacrylic acid (PAA). In one embodiment, the PAA is linear PAA with a molecular weight greater than 100 KDa or cross-linked PAA with a linear backbone molecular weight between adjacent crosslinks (Mc) greater than 10 KDa.

The present self-sealing media overcome the limitations of currently available products that only seal upon exposure to aqueous-based solutions containing up to about 40% organic solvents. This invention provides products that block a spectrum of solutions from 100% aqueous solutions to 100% polar organic solutions. The organic solvent blocking media in some embodiments of the present invention are useful in a variety of applications including but not limited to the following: pipette tip filter, serological pipette filter, in line filter, vent, non-mechanical check valve, safety valve, vent for a battery, vent for inkjet cartridges, vent for liquid containers and suction canister. The organic solvent blocking media can also be used as a gas vent and a liquid stopper for any device that needs to prime a container or a section of the device to remove air and fill with liquid. This facilitates greater pumping efficiency while preventing spills from contaminating a pumping device. The organic solvent blocking media can allow the air and gas to escape from the device but not the liquid. The devices include but are not limited to liquid pumps, especially for pumping liquid containing organic solvents and acids; solution filling and spraying devices, such as coating sprayers and ink jet printers.

In this patent application, all liquid solution mixture concentrations are based on volume unless otherwise indicated. For example, a 40% isopropyl alcohol (IPA) aqueous solution means 40% by volume is IPA and 60% by volume is water. All solid powder blends are based on weight unless they are specifically noticed, for example 20% additive and 80% thermoplastic powder means the blends have 20% by weight of additives and 80% by weight of thermoplastic powder.

The new porous self-sealing media of the present invention can block inorganic and organic solutions at concentrations of 40% or more. The present invention also provides self-sealing media that block aqueous solutions of inorganic acids or organic acids at concentrations of from 0% to 100%. Use of these media provides a safer environment for transfer of highly corrosive inorganic acids and organic acids.

In some embodiments, the porous plastic self-sealing media disclosed herein block basic aqueous solutions comprised of from about 0% to 100%, 5% to 95%, 10% to 90%, 15% to 85%, or 20% to 80% bases at 2 psi pressure.

Absorbent Materials

The present self-sealing media comprise an absorbent material which rapidly expands as it absorbs water and polar organic solvents. In different embodiments, absorbent materials in this invention are typically classified as non cross-linked or lightly cross-linked polyacrylic acids (PAAs). In some embodiments the PAAs are not neutralized. As defined herein, lightly cross-linked means that the cross-linking density is less than about 0.5%, less than about 0.2% or less than about 0.1%. Traditional super absorbent materials are generally not useful in the present invention. Many super absorbent materials are quickly neutralized and form salts, or are highly cross-linked. Salt formation and a high degree of crosslinking decreases solubility and dissolution speed in organic solvents and solutions, and in acidic solutions. Although traditional super absorbent materials work well for aqueous solutions, they generally do not dissolve in polar organic solvents or block a solution containing more than 40% organic solvents. This is one reason why current products fail to block organic-based solutions or an aqueous-based solutions with more than 40% organic solvents.

In some embodiments, powdered PAA is useful in embodiments of the present invention as an additive for improving organic solvent blocking properties of the porous thermoplastic media. Molecular weights of the PAA greater than about 100 KDa may be employed. PAA of at least 750 KDa, 1,250 KDa, 3,000 KDa, 4,000 KDa, 10,000 KDa or 100,000 KDa may be employed. Lower molecular weight PAA or lightly cross-linked PAA may also be employed. For cross-linked PAA, the linear backbone molecular weight between the adjacent crosslinks (Mc) are greater than about 10 KDa, 50 KDa, 100 KDa, 500 KDa, 1,000 KDa, 2,000 KDa, 4,000 KDa, 10,000 KDa, or greater than 100,000 KDa. Particulate forms of PAA may be employed. In one embodiment, linear non cross-linked PAA powder is preferred. Non cross-linked PAA, includes linear and branched PAA.

In other embodiments, polymers and copolymers that may function as absorbent materials inorganic solvent blocking media are linear chain poly(methacrylic acid), linear chain polyacrylamide and linear chain polyhydroxyethylmethacrylate. These polymers are preferred in linear chain form, or with crosslinking less than about 0.5%, less than about 0.2% or less than about 0.1%. The terms powder and particle are used interchangeably in this application.

In some embodiments, PAA powder is mixed with particles of thermoplastic to make a uniform dry blend. The weight ratio of PAA to thermoplastic (PAA:plastic) may be from about 1% to about 45%, from about 3% to about 40%, from about 5% to about 35%, or from about 10% to about 30%, (all expressed as wt % of the blend of absorbents and thermoplastics).

In some embodiments, the absorbent material in the sintered porous matrix is from about 1% to about 45%, from about 3% to about 40%, from about 5% to about 35%, or from about 10% to about 30%, by weight of the sintered porous matrix.

PAA powders are available from Sigma Aldrich Corporation (St. Louis, Mo., US). They also are available from Lubrizol Corporation (Wickliffe, Ohio, US), under the trade name of CARBOPOL, PEMULEN, and NOVEON, BASF under the trade name of DISPEX, and EVONIK under the trade name of DEGAPAS. Similar products can be purchased from the following companies, Nippon Shokubai, Mitsubishi chemical, Dow Chemicals, and LG Chemicals.

In some embodiments, other absorbent materials, including carboxymethylcellulose (CMC) and other superabsorbent materials can be blended together with PAA powder and thermoplastic powder to form sintered self-sealing porous matrix. Superabsorbents that can be added into PAA and thermoplastic blends include, but are not limited to: hydrolyzed starch acrylonitrile graft copolymer, acrylonitrile copolymer, hydrolyzed acrylonitrile copolymer; neutralized starch-acrylic acid graft copolymer; saponified acrylic acid ester-vinyl acetate copolymer; acrylamide copolymer; modified cross-linked polyvinyl alcohol; neutralized cross-linked polyacrylic acid; polyacrylate salts; neutralized cross-linked isobutylene-maleic anhydride copolymers; and salts and mixtures thereof. In one embodiment, superabsorbents are sodium polyacrylic acid and the sodium salt of poly (2 propenamide-co-2-propenoic acid). Adding absorbent materials to the PAA and thermoplastic blends is for achieving optimized results for optimal wide range solution blocking performance. The amount of absorbent materials in the blend can vary from 0.1% to 20%, or from 1% to 10% (wt %).

PAA and other additives, such as CMC and other superabsorbent powders should be fine and substantially uniformly mixed with thermoplastic powder before sintering into a substantially uniform distribution inside the sintered porous matrix. In some embodiments, the particle size of the PAA and other additives is less than or equal to the particle size of the thermoplastic powder, for example less than about 100 microns, less than about 50 microns, or less than about 10 microns. In some embodiments, the absorbent material in the sintered porous matrix is from about 1% to about 45%, from about 3% to about 40%, from about 5% to about 35%, or from about 10% to about 30%, by weight of the sintered porous matrix.

Thermoplastics

Thermoplastics which may be employed include but are not limited to high density polyethylene (HDPE), low density polyethylene (LDPE), very high molecular weight polyethylene (VHMWPE) and ultrahigh molecular weight polyethylene (UHMWPE). Other thermoplastics which may be used include polypropylene, ethylene vinyl acetate (EVA), polyesters, polyamides, polystyrene and polyvinylidene fluoride (PVDF).

Polyethylene, in one embodiment, comprises high density polyethylene (HDPE). High density polyethylene, as used herein, refers to polyethylene having a density ranging from about 0.92 g/cm$^3$ to about 0.97 g/cm$^3$. In some embodiments, high density polyethylene has a degree of crystallinity (% from density) ranging from about 50 to about 90. HDPE has a molecular weight between about 100,000 Daltons (Da) to 500,000 Da.

In another embodiment, polyethylene comprises ultrahigh molecular weight polyethylene (UHMWPE). Ultrahigh molecular weight polyethylene, as used herein, refers to polyethylene having a molecular weight greater than 1,000,000 Da, in some embodiments between 3,000,000 Da and 6,000,000 Da.

In another embodiment, polyethylene comprises very high molecular weight polyethylene (VHMWPE). Very high molecular weight polyethylene, as used herein, refers to polyethylene having a molecular weight greater than 300,000 Da and less than 1,000,000 Da.

Elastomers

Elastomers may be optionally employed in the compositions of the present invention. Elastomeric particles can be rubbers, vulcanized polymers, thermoplastic elastomers, thermoplastic polyurethane, block copolymer of butadiene and polystyrene, copolymer of styrene-butadiene-styrene (SBS), and copolymer of styrene-ethylene-butadiene-styrene (SEBS), copolymer of polypropylene and polyethylene, etc. Elastomers may be employed in amounts of 0.1% to about 25%, or from about 1% to about 20%, or from about 5% to about 15% (expressed as wt % of the blend of absorbents and thermoplastics).

Color Change Indicators

Color change indicators may be optionally employed in the compositions of the present invention. Color change indicators may be added to the porous organic solvent blocking media to show the extent of contact of the media with a liquid. In one embodiment, color change indicators are added before sintering. In some embodiments, a color change indicator comprises an inorganic or organic dye, including food grade dyes, azo compounds, or azo dyes. In some embodiments, color change indicators do not comprise inorganic salts, including transition metal salts. In some embodiments, color change indicators may be in particle form and are generally uniformly distributed in the sintered porous self-sealing media In some embodiments, a color change indicator comprises FD&C Blue No. 1, FD&C Blue No. 2, FD&C Green No. 3, FD&C Red No. 40, FD&C Red No. 3, FD&C Yellow No. 5, FD&C Yellow No. 6, Solvent Red 24, Solvent Red 26, Solvent Red 164, Solvent Yellow 124, Solvent Blue 35, or combinations thereof.

Color change indicators, according to some embodiments, demonstrate a pH dependency on the color produced. As a result, color change indicators, in some embodiments, indicate not only liquid contact with the barrier composition but the relative pH of the contacting liquid as well. Color change indicators demonstrating a pH dependency, in some embodiments, comprise methyl violet, eosin yellow, malachite green, thymol blue, methyl yellow, bromophenol blue, Congo red, methyl orange, bromocresol green, methyl red, litmus, bromocresol purple, bromophenol red, bromothymol blue, phenol red, neutral red, naphtholphthalein, cresol red, phenolphthalein, thymolphthalein, alkali blue, Alizarin Yellow R, indigo carmine, epsilon blue, or combinations thereof.

Color changing agents that are soluble in organic solvents may also be used, for example fat soluble dyes, such as Sudan I, II, III, IV and clofazimine etc.

Color change indicators may be employed in amounts of about 0.001% to about 2%, about 0.005% to about 1%, about 0.01% to about 0.5% (expressed as wt % of the blend of absorbent and thermoplastic).

Method of Making Porous Plastic Self-Sealing Media

The present self-sealing porous media comprising an absorbent material and a thermoplastic, are made through a sintering process. A mixture of these materials in powder or particle form is sintered at temperatures of about 250° F. to about 580° F. depending on the specific thermoplastic employed. These self-sealing media are generally molded into the desired shape. The sintering process can be conducted at ambient pressure or under increased pressure. The pressure can be from 1 PSI to 100 PSI. The mixtures of these materials are filled into mold cavities through gravity or vibrational processes. Porous self-sealing media can also be made into a sheet form which can be die cut sheet into desired shapes.

In one embodiment, a blend of PAA powder and thermoplastic particles, or PAA powder, thermoplastic particles and CMC or other superabsorbent powder is sintered at temperatures of about 250° F. to about 580° F. depending on the specific thermoplastic employed. Appropriate sintering temperatures for specific thermoplastics are known to one of ordinary skill in the art. The duration of heating and cooling cycles depends on the part size, mold design and desired physical properties. These variables are known to one of ordinary skill in the art.

Properties of Porous Self-Sealing Media

Physical Chemical Properties

In one embodiment the average pore size of the porous self-sealing media is from about 1 micron to about 200 microns, from about 5 microns to about 100 microns, or from about 10 microns to about 50 microns. The average pore size is determined by a mercury porosimetry using the ASTM D4404 method.

The porosities the porous self-sealing media disclosed herein are from about 10% to about 70%, or from about 20% to about 60%, or from about 30% to about 50%.

Functional Properties

The porous self-sealing media can seal and block aqueous solutions, mixtures of water and organic solvents, and organic solvents. The percentage of organic solvents in the aqueous solution can be from 0% to 50%, 0% to 60%, 0% to 70%, 0% to 80%, 0% to 90% or 0% to 100% (vol %). The percentage of organic solvents in the aqueous solution can be greater than 40%, can be less than 80% or between about 40% to about 50%, about 40% to about 60%, about 40% to about 70% or about 40% to about 80%. The porous organic solvent blocking media of the invention can also seal and block non-aqueous based polar organic solvents, i.e., 100% polar organic solvent.

In some embodiments, the porous plastic self-sealing media of the present invention can block inorganic and organic solutions at concentrations of about 40% or more. The present invention also provides self-sealing media that block aqueous solutions of inorganic acids or organic acids at concentrations of from 0% to 100%.

In some embodiments, the porous plastic self-sealing media disclosed herein block basic aqueous solutions comprised of from about 0% to about 100%, about 5% to about 95%, about 10% to about 90%, about 15% to about 85%, or about 20% to about 80%, bases at 2 psi pressure.

The porous media disclosed herein may block aqueous surfactant solution comprised of surfactants at concentrations from about 0% to about 100%, 0% to 95%, 0% to 90%, 0% to 85%, 0% to 80%, 0% to 70%, 0% to 50%, 0% to 40%, 0% to 30%, 0% to 20%, 0% to 10%, 0% to 5%, or 0% to 2% at 2 psi pressure.

The porous self-sealing media can block the passage of aerosol particles. The porous self-sealing media also block passage of bacteria with a filtration efficiency greater than 90%, 99%, or 99.9% based on ASTM F 2101.

Configurations of the Sintered Porous Self-Sealing Media

In one embodiment, the sintered porous self-sealing plastic media is configured in one layer. In other embodiments, the sintered porous self-sealing can be sandwiched between two layers of sintered porous plastic media that do not comprise self-sealing agents. In one specific embodiment the sintered porous self-sealing media is sandwiched between two layers of sintered porous plastic of polyethylene. Color change indicators may be placed in any one of the layers. In some embodiments, the color change indicators FD&C Blue No. 1 or FD&C Red No. 40 are used for good contrast to sintered white porous plastic media. In different embodiments, elastomers may be used throughout the sintered porous self-sealing media, in a single layer, or at the perimeter of the media.

Devices Comprising Self-Sealing Media

In different embodiments, the self-sealing media can be incorporated into numerous devices. The self-sealing media can be placed into a housing inside a device. These include, but are not limited to, containers, pipette tips, valves, vents, liquid delivery systems, and syringe caps. Other potential uses for, and devices comprising, the self-sealing media disclosed herein include, but are not limited to, the protection of transducers, ink pen vents, the protection of vacuum pumps and/or systems, the protection of pneumatic components, use in the high speed filling of containers such as those used for batteries and beverages, emergency spill valves for chemical containers such as drums and bottles as well as those used on trains and other vehicles, "burp" or "blow-out" valves, use in the filling of refrigerant, brake, or hydraulic systems, and vents in items such as inkjet cartridges and disk drives.

Since the self-sealing media are porous, they can act as a safety valve, for example located in or on a container above the level of the organic fluid. Since these media are porous, they permit the passage of gas, thereby functioning as a vent. If the container were to tip, the porous self-sealing media would seal upon contact with the organic fluid, thereby preventing or retarding the organic solvent from spilling out of the container.

One embodiment of porous self-sealing media is its use as a pipette tip filter to prevent handheld pipettors or automatic liquid pipetting machines from contamination by accidental over pipetting of solutions containing more than 40% organic solvents or solutions of acids or bases.

Figure 2:
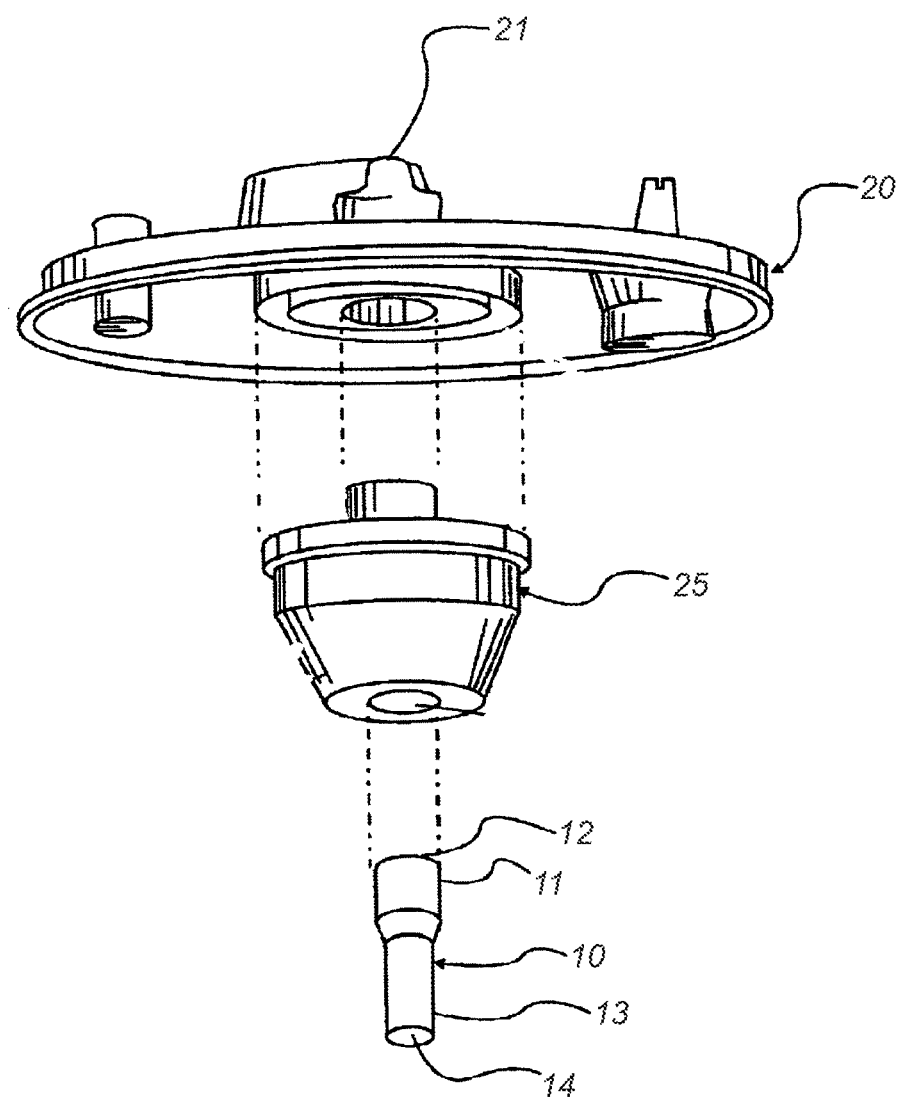
FIG. 2 is an exploded view of a suction canister lid containing the filter 10 comprising a porous self-sealing media that blocks organic solvents and a filter shield in accordance with one embodiment of the invention. The filter 10 of the invention is adapted to be positioned within the conduit or passageway of a suction canister lid 20, particularly the underside of the lid, such that air flow (and eventually fluid) contacts the filter 10 at the flow path into the vacuum port 21 such that the filter 10 precedes the vacuum source and its associated tubing (not shown). The filter 10 in its "dry" state permits the passage of air through the filter from the interior canister environment and into the vacuum port 21 and environment beyond the lid 20. The filter 10 of the invention can be coupled either directly or indirectly onto the underside of the lid 20. A filter shield 25, functions to both control the sequence of fluid contact to the filter 10 and to secure the filter 10 to the underside of the lid 20. In one embodiment the filter 10 and filter shield 25 of the invention are assembled by inserting the filter 10 in a longitudinal direction into the filter shield 25 and attaching the filter shield 25 and filter 10 (not shown) to the underside of the suction canister lid 20. Alternatively, the filter shield 25 can be attached to the canister lid 20 first, and the filter 10 inserted therein after. The lid 20 can then be attached to the rim of a reservoir (not shown). In the case of the alternative embodiment wherein the filter shield is integrated as part of the lid, there is no filter shield attachment step. Associated tubing and attachments can be affixed onto various ports and openings of the lid, such as tubing for a tandem port, a cap for a pour spout, and vacuum tubing to the vacuum port.
Figure 3:
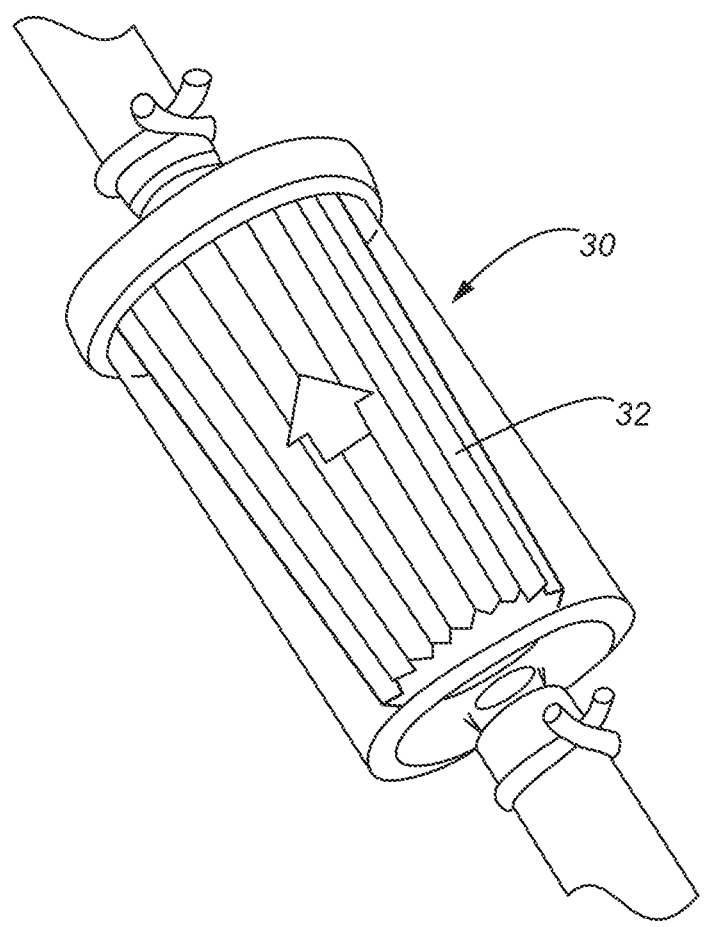
FIG. 3 is a schematic representation of a filter 30 comprising a porous self-sealing media that blocks organic solvents for an in line self-sealing gas or air filter 32. The arrow indicates the direction of gas or airflow.

Another embodiment of porous self-sealing media is its use as vent for suction devices to prevent contamination of suction devices or vacuum systems by accidental over suction of solutions containing more than about 40% organic solvents. The suction devices include but are not limited to a suction canister in a medical or scientific device or a vacuum cleaner for cleaning organic solvent spills. The self-sealing media for use in a suction device such as a suction canister may be any shape to fit within the gas flow path in the devise. The media may appear as shown in FIG. 2. In another embodiment, the media may be in the form of a disc for insertion at another location in the canister, for example near the filter lid.

Yet another embodiment of porous self-sealing media is its use as a vent for an ink cartridge to allow air to pass to balance the negative pressure inside the cartridge during use, and at the same time, to prevent ink with high organic solvent content from leaking when the cartridge is tipped over.

Still another embodiment of porous self-sealing media is its use as a vent for organic solvent filling devices to allow air to pass to balance the negative pressure inside the device during the filling process, and at same time, to prevent organic solvent from leaking when the device is tipped over.

Since the self-sealing organic solvent blocking media are also block inorganic and organic acidic solutions, they can act as a safety valve for containers of inorganic or organic acids. These media can prevent the spill of solutions of inorganic or organic acids from the containers when the containers are tipped.

Figure 4:
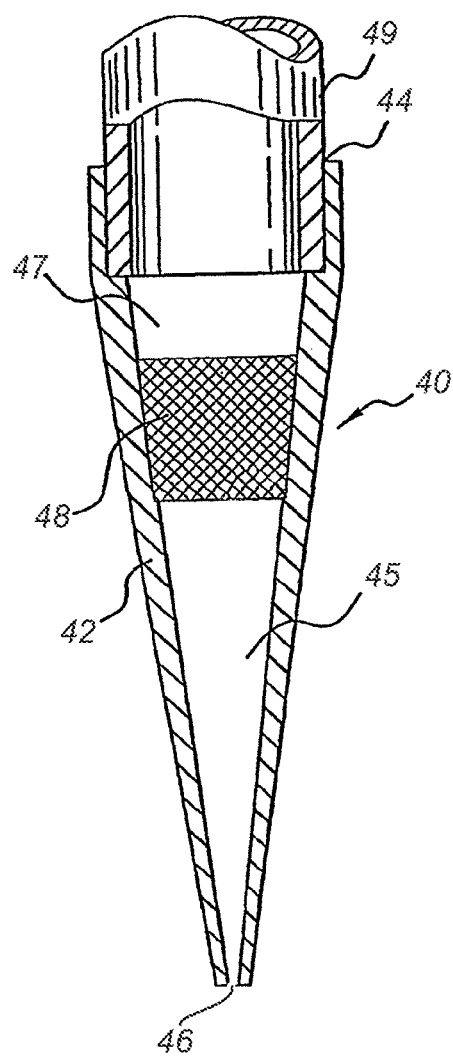
FIG. 4 is a schematic representation of a pipette tip containing a filter comprising a porous self-sealing media that blocks organic solvents.
Figure 6A:
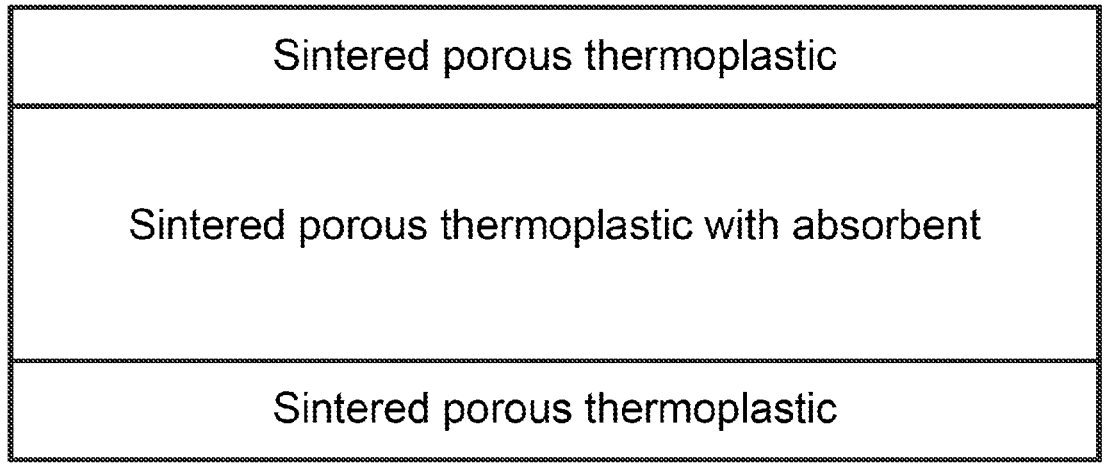
FIG. 6 is a schematic representation of two trilaminar structures. In A (top panel) a porous media comprising a sintered porous thermoplastic layer with absorbent is adjacent on both sides to sintered porous thermoplastic layers with no absorbent. In B (bottom panel) a porous media comprising a sintered porous thermoplastic layer with absorbent and a color change indicator is adjacent on both sides to a sintered porous thermoplastic layer with no absorbent or color change indicator.
Figure 6B:
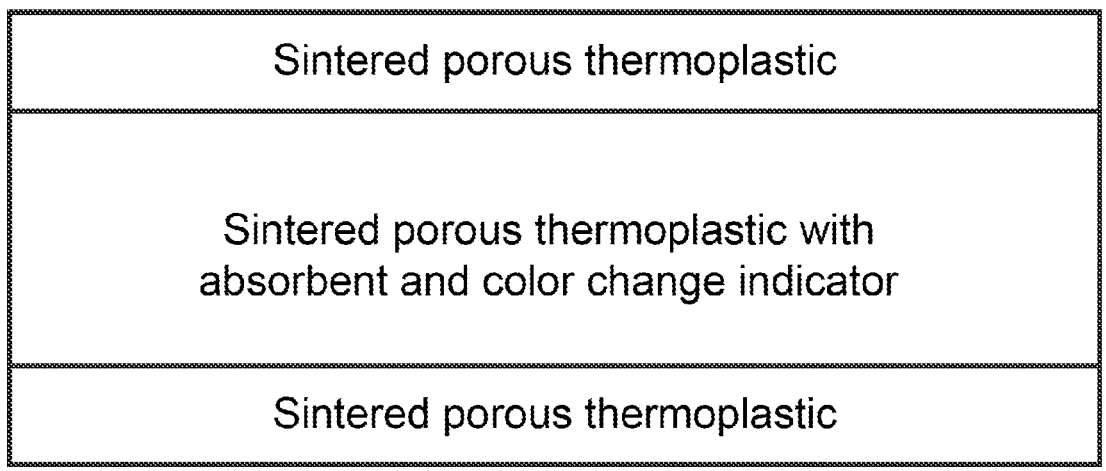
Figure 7:
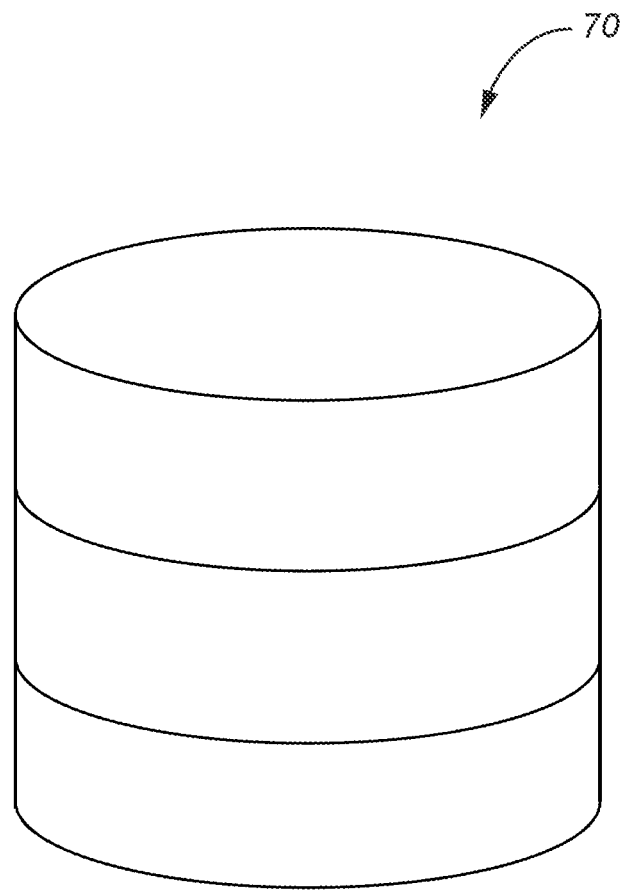
FIG. 7 is a three-dimensional schematic representation of a self-sealing medium in the form of a trilaminar disc. The individual layers could correspond to the layers described in FIGS. 5 and 6.

In one embodiment, the self-sealing media are used as a vent for an acid based battery, such as a car battery, a golf car battery and a truck battery. An example of a vent for a battery is shown as a frit labeled as item 42 in FIG. 4 of U.S. Pat. No. 6,110,617. In this embodiment, the self-sealing media allows gas to pass in a normal position to prevent dangerous hydrogen gas from building up inside the battery. At the same time the self-sealing media also block the leaking of hazardous acids when the automobile is involved in an accident or the battery is tipped over during transport. Current acid battery vents do not block the leakage of acid.

In one embodiment the self-sealing media are used as a pipette tip filter to prevent handheld pipettors or automatic liquid pipetting machines from contamination by accidental over pipetting of solutions containing inorganic or organic acids.

Organic Solutions

Organic solutions which may be blocked with the porous media disclosed herein are polar organic solvents that are miscible with water. They include but are not limited to the following: alcohols, such as methanol, ethanol, propanol, isopropanol, butanol etc.; ketones, such as acetone or methylethylketone (MEK); aldehydes, such as formaldehyde or acetaldehyde; organic acids, such as acetic acid, formic acid, or lactic acid; amines, such as ammonia, methylamine, dimethylamine, trimethylamine, ethylamine, diethylamine, triethylamine, ethanolamine, anilines, or pyridines; dimethylsulfoxide (DMSO), dimethylformamide (DMF), dimethylacetamide (DMAC), N-Methyl-2-pyrrolidone (NMP), epichlorohydrin, tetrahydrofuran (THF), and acetonitrile. Organic solutions also include but are not limited to methanol, acetone, acrylonitrile, pyridine, acetic acid, trifluoroacetic acid (TFA), butanol, ethanol, dioxane, dimethoxyethane, diethanolamine, formaldehyde, and ethylene glycol.

Organic solutions may also contain other organic compounds that have limited miscibility with water, but are miscible with organic solvents, such as phenols, cyclohexanone, and aromatic acids.

Acidic Liquid Solutions

Acidic aqueous solutions that may be blocked by the porous media disclosed herein include solutions of organic acids and solutions of inorganic acids. Organic acids include, but are not limited to, acetic acid, trifluoroacetic acid, trichloroacetic acid, formic acid, lactic acid, citric acid, oxalic acid, tartaric acid, gluconic acid, methanesulfonic acid, ethanesulfonic acid, benzenesulfonic acid, p-toluenesulfonic acid, and trifluomethanesulfonic acid. Inorganic acids include, but are not limited to, sulfuric acid, fluorosulfuric acid, nitric acid, phosphoric acid, fluoroboric acid, fluoroantimonic acid, chromic acid, boric acid, hydrochloric acid, hydrobromic acid, hydroiodic acid, hypochlorous acid, chlorous acid, chloric acid and perchloric acid.

Porous media disclosed herein may block acidic aqueous solutions comprised of from about 0% to about 100%, 0% to 95%, 0% to 90%, 0% to 85%, or 0% to 80%, 0% to 60%, 0% to 50%, or 0% to 40% acid at 2 psi pressure.

Basic Liquid Solutions

Basic aqueous solutions may be blocked by the porous media disclosed herein include solutions of organic bases and solutions of inorganic bases. Organic bases include, but are not limited to, methylamine, ethylamine, ethylenediamine, ammonia, and other water soluble organic amines. Inorganic bases include sodium hydroxide, potassium hydroxide, cesium hydroxide, and lithium hydroxide. Porous media disclosed herein may block basic aqueous solutions comprised of from about 0% to 100%, 5% to 95%, 10% to 90%, 15% to 85%, or 20% to 80%, bases at 2 psi pressure.

Surfactant Liquid Solutions

Aqueous solutions containing surfactants may be blocked by the porous media disclosed herein. Such surfactants include, but are not limited to, anionic surfactants, such as sodium dodecylsulfate (SDS); cationic surfactants, such as cetyltrimethylammonium bromide (CTAB), non-ionic surfactants such as nonyl phenoxypolyethoxylethanol (NP-40), Tween-20, Triton-100, and amphoteric surfactants, such as 3-[(3-Cholamidopropyl)dimethylammonio]-1-propane-sulfonate. Fluorosurfactants may also be blocked, such as Zonyl® fluorosurfactant from DuPont. Many other surfactants as known to one of ordinary skill in the art may also be blocked by these porous media. The porous media disclosed herein may block aqueous surfactant solution comprised of surfactants at concentrations from about 0% to 100%, 0% to 95%, 0% to 90%, 0% to 85%, 0% to 80%, 0% to 70%, 0% to 50%, 0% to 40%, 0% to 30%, 0% to 20%, 0% to 10%, 0% to 5%, or 0% to 2% at 2 psi pressure.

In one embodiment, the porous self-sealing medium comprises a sintered mixture of thermoplastic particles and PAA powders.

In one embodiment, the porous self-sealing medium comprises a sintered mixture of thermoplastic particles and PAA powders, wherein the PAA powder is linear PAA with a molecular weight greater than 100 KDa or cross-linked PAA with a linear backbone molecular weight between adjacent crosslinks (Mc) greater than 10 KDa.

In another embodiment, the porous self-sealing medium comprises a sintered mixture of thermoplastic particles, PAA powders and CMC particles.

In yet another embodiment, the porous self-sealing medium comprises a sintered mixture of thermoplastic particles, PAA powders and super absorbent particles.

In one embodiment, the porous self-sealing medium comprises a sintered mixture of thermoplastic particles, elastomeric particles and PAA powders.

In another embodiment, the porous self-sealing medium comprises a sintered mixture of thermoplastic particles, elastomeric particles, PAA powders and CMC particles.

In yet another embodiment, the porous self-sealing medium comprises a sintered mixture of thermoplastic particles, elastomeric particles, PAA powders and superabsorbent particles.

In another embodiment, the porous self-sealing medium comprises a sintered mixture of thermoplastic particles, PAA powders and color change indicators.

In yet another embodiment, the porous self-sealing medium comprises a sintered mixture of thermoplastic particles, elastomeric particles, PAA powders and color change indicators.

The performance of the porous plastic self-sealing media described in the examples as products A through P were tested as described in this paragraph. This embodiment of the porous plastic self-sealing media was as a pipette tip filter. All testing described in the following examples was performed in a 200 µl pipette tip. The porous plastic self-sealing filters were inserted at the location in the pipette tip corresponding to a location about 50 µl from the tip opening which contacts liquid. The pipette device was set at 200 µl to pull liquid through the porous filter and cause an over-pipetting event. The filtered pipette tips were securely mounted on the barrel of the pipette device, and the pipette plunger was pushed down and quickly released (thumb quickly removed from the plunger). The liquid level was observed. If the liquid passed the filter, the filter was labeled as a failure. If the liquid did not reach the top of the filter, the filter was labeled as successfully blocking the fluid. Various solutions were tested as shown in Tables 1 through 4. The differential pressure applied to the filters during the pipetting process is about 2 psi or 0.138 bar.

The average pore size and pore volume of the sintered porous media in this invention is measured by a mercury intrusion porosimeter following the ASTM D 4404 method.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention.

Example 1

Product A: A powder blend comprising 90% (weight) of GUR very high molecular weight polyethylene (VHMWPE) with median particle size of 130 microns (Ticona, Florence, Ky., US) and 10% polyacrylic acid powder with molecular weight of 750,000 Da (Sigma Aldrich, St. Louis, Mo., US) was sintered in an aluminum mold at 350° F. for 3 minutes and cooled to room temperature in 5 minutes. The resulting filters had an average pore size of 25 microns and average pore volume of 40%.

Example 2

Product B: A powder blend comprising 90% (weight) of GUR ultrahigh molecular weight polyethylene (UHMWPE) with median particle size of 60 microns (Ticona, Florence, Ky., US) and 10% polyacrylic acid powder with molecular weight of 750,000 Da (Sigma Aldrich, St. Louis, Mo., US) was sintered in an aluminum mold at 360° F. for 3 minutes and cooled to room temperature in 5 minutes. The resulting filters had an average pore size of 15 microns and average pore volume of 40%.

Example 3

Product C: A powder blend comprising 90% (weight) of ultrahigh molecular weight polyethylene (UHMWPE) with median particle size of 30 microns (Mitsui, Tokyo, Japan) and 10% polyacrylic acid powder with molecular weight of 750,000 Da (Sigma Aldrich, St. Louis, Mo., US) was sintered in an aluminum mold at 360° F. for 3 minutes and cooled to room temperature in 5 minutes. The resulting filters had an average pore size of 10 microns and average pore volume of 40%.

Example 4

Product D: A powder blend comprising 80% (weight) of GUR very high molecular weight polyethylene (VHMWPE) with median particle size of 130 microns (Ticona, Florence, Ky., US), 10% polyacrylic acid powder with molecular weight of 750,000 Da (Sigma Aldrich, St. Louis, Mo., US) and 10% high molecular weight carboxymethylcellulose (CMC) (Tic Gums, White Marsh, Md., US) was sintered in an aluminum mold at 350° F. for 3 minutes and cooled to room temperature in 5 minutes. The resulting filters had an average pore size of 27 microns and average pore volume of 40%.

Example 5

Product E: A powder blend comprising 90% (weight) of GUR very high molecular weight polyethylene (VHMWPE) with median particle size of 130 microns (Ticona, Florence, Ky., US) and 10% Carbopol 907 powder (Lubrizol, Wickliffe, Ohio, US) was sintered in an aluminum mold at 350° F. for 3 minutes and cooled to room temperature in 5 minutes. The resulting filters had an average pore size of 25 microns and average pore volume of 40%.

Example 6

Product F: A powder blend comprising 90% (weight) of GUR ultrahigh molecular weight polyethylene (UHMWPE) with median particle size of 60 microns (Ticona, Florence, Ky., US) and 10% Carbopol 907 powder (Lubrizol, Wickliffe, Ohio, US) was sintered in an aluminum mold at 360° F. for 3 minutes and cooled to room temperature in 5 minutes. The resulting filters had an average pore size of 15 microns and average pore volume of 40%.

Example 7

Product G: A powder blend comprising 90% (weight) of ultrahigh molecular weight polyethylene (UHMWPE) with media particle size of 30 microns (Mistui, Tokyo, Japan) and Carbopol 907 powder (Lubrizol, Wickliffe, Ohio, US) was sintered in an aluminum mold at 360° F. for 3 minutes and cooled to room temperature in 5 minutes. The resulting filters had an average pore size of 10 microns and average pore volume of 40%.

Example 8

Product H: A powder blend comprising 80% (weight) of GUR very high molecular weight polyethylene (VHMWPE) with media particle size of 130 microns (Ticona, Florence, Ky., US), 10% Carbopol 907 powder (Lubrizol, Wickliffe, Ohio, US) and 10% high molecular weight carboxymethylcellulose (CMC) (Tic Gums, White Marsh, Md., US) was sintered in an aluminum mold at 350° F. for 3 minutes and cooled to room temperature in 5 minutes. The resulting filters had an average pore size of 27 microns and average pore volume of 40%.

Example 9

Product I: A powder blend comprising 100% (weight) of GUR very high molecular weight polyethylene (VHMWPE) with media particle size of 130 microns (Ticona, Florence, Ky., US) was sintered in an aluminum mold at 350° F. for 3 minutes and cooled to room temperature in 5 minutes. The resulting filters had an average pore size of 25 microns and average pore volume of 40%.

Example 10

Product J: A powder blend comprising 100% (weight) of GUR ultrahigh molecular weight polyethylene (UHMWPE) with media particle size of 60 microns (Ticona, Florence, Ky., US) was sintered in an aluminum mold at 360° F. for 3 minutes and cooled to room temperature in 5 minutes. The resulting filters had an average pore size of 15 microns and average pore volume of 40%.

Example 11

Product K: A powder blend comprising 90% (weight) of GUR very high molecular weight polyethylene (VHMWPE) with media particle size of 130 microns (Ticona, Florence, Ky., US) and 10% high molecular weight carboxymethylcellulose (CMC) (Tic Gums, White Marsh, Md., US) was sintered in a aluminum mold at 350° F. for 3 minutes and cooled to room temperature in 5 minutes. The resulting filters had an average pore size of 25 microns and average pore volume of 40%.

Example 12

Product L: A powder blend comprising 90% (weight) of GUR ultrahigh molecular weight polyethylene (UHMWPE) with media particle size of 60 microns (Ticona, Florence, Ky., US) and 10% high molecular weight carboxymethylcellulose (CMC) (Tic Gums, White Marsh, Md., US) was sintered in a aluminum mold at 360° F. for 3 minutes and cooled to room temperature in 5 minutes. The resulting filters had an average pore size of 15 microns and average pore volume of 40%.

TABLE 1

Blocking properties for isopropanol (IPA) and water mixture solutions for products A through L.

| Product | DI water | 20% IPA | 40% IPA | 60% IPA | 80% IPA | 100% IPA |
|---|---|---|---|---|---|---|
| A | Block | Block | Block | Block | Block | Fail |
| B | Block | Block | Block | Block | Block | Block |
| C | Block | Block | Block | Block | Block | Block |
| D | Block | Block | Block | Block | Block | Fail |
| E | Block | Block | Block | Block | Block | Fail |
| F | Block | Block | Block | Block | Block | Block |
| G | Block | Block | Block | Block | Block | Block |
| H | Block | Block | Block | Block | Block | Fail |
| I | Fail | Fail | Fail | Fail | Fail | Fail |
| J | Block | Fail | Fail | Fail | Fail | Fail |
| K | Block | Block | Block | Fail | Fail | Fail |
| L | Block | Block | Block | Fail | Fail | Fail |

The results in Table 1 show that the combination of PAA with UHMWPE or VHMWPE was superior to UHMWPE or VHMWPE alone, or UHMWPE or VHMWPE combined with CMC in blocking passage of isopropanol, particularly at higher concentrations of IPA.

TABLE 2

Blocking properties for DMSO and water mixture solutions:

| Product | DI water | 20% DMSO | 40% DMSO | 60% DMSO | 80% DMSO | 100% DMSO |
|---|---|---|---|---|---|---|
| A | Block | Block | Block | Block | Block | Fail |
| B | Block | Block | Block | Block | Block | Block |
| C | Block | Block | Block | Block | Block | Block |
| D | Block | Block | Block | Block | Block | Fail |
| E | Block | Block | Block | Block | Block | Fail |
| F | Block | Block | Block | Block | Block | Block |
| G | Block | Block | Block | Block | Block | Block |
| H | Block | Block | Block | Block | Block | Fail |
| I | Fail | Fail | Fail | Fail | Fail | Fail |

TABLE 2-continued

Blocking properties for DMSO and water mixture solutions:

| Product | DI water | 20% DMSO | 40% DMSO | 60% DMSO | 80% DMSO | 100% DMSO |
|---|---|---|---|---|---|---|
| J | Block | Fail | Fail | Fail | Fail | Fail |
| K | Block | Block | Block | Fail | Fail | Fail |
| L | Block | Block | Block | Fail | Fail | Fail |

The results in Table 2 show that the combination of PAA with UHMWPE or VHMWPE was superior to UHMWPE or VHMWPE alone, or UHMWPE or VHMWPE combined with CMC in blocking passage of DMSO, particularly at higher concentrations of DMSO.

TABLE 3

Blocking properties for methanol and water mixture solutions:

| Product | DI water | 20% methanol | 40% Methanol | 60% Methanol | 80% methanol | 100% Methanol |
|---|---|---|---|---|---|---|
| A | Block | Block | Block | Block | Block | Block |
| B | Block | Block | Block | Block | Block | Block |
| C | Block | Block | Block | Block | Block | Block |
| D | Block | Block | Block | Block | Block | Block |
| E | Block | Block | Block | Block | Block | Block |
| F | Block | Block | Block | Block | Block | Block |
| G | Block | Block | Block | Block | Block | Block |
| H | Block | Block | Block | Block | Block | Block |
| I | Fail | Fail | Fail | Fail | Fail | Fail |
| J | Block | Fail | Fail | Fail | Fail | Fail |
| K | Block | Block | Block | Fail | Fail | Fail |
| L | Block | Block | Block | Fail | Fail | Fail |

The results in Table 3 show that the combination of PAA with UHMWPE or with VHMWPE was superior to either UHMWPE or VHMWPE alone, or to UHMWPE or VHMWPE combined with CMC, in blocking the passage of methanol, particularly at higher concentrations of methanol, including 100% methanol.

Example 13

Product M: A powder blend comprising 90% (weight) of GUR Ultrahigh molecular weight polyethylene (UHMWPE) with median particle size of 60 microns (Ticona, Florence, Ky., US) and 10% Carbopol® 941 powder (Lubrizol, Wickliffe, Ohio, US) was sintered in an aluminum mold at 350° F. for 3 minutes and cooled to room temperature in 5 minutes. The resulting filters had an average pore size of 15 microns and average pore volume of 38%.

Example 14

Product N: A powder blend comprising 90% (weight) of GUR very high molecular weight polyethylene (VHMWPE) with median particle size of 130 microns (Ticona, Florence, Ky., US) and 10% Carbopol 941 powder (Lubrizol, Wickliffe, Ohio, US) was sintered in an aluminum mold at 350° F. for 3 minutes and cooled to room temperature in 5 minutes. The resulting filters had an average pore size of 25 microns and average pore volume of 40%.

Example 15

Product O: A powder blend comprising 90% (weight) of GUR very high molecular weight polyethylene (VHMWPE) with media particle size of 130 microns (Ticona, Florence, Ky., US) and 10% high molecular weight carboxymethyl cellulose (CMC) (Tic Gums, White Marsh, Md., US) was sintered in an aluminum mold at 350° F. for 3 minutes and cooled to room temperature in 5 minutes. The resulting filters had an average pore size of 27 microns and average pore volume of 40%.

Example 16

Product P: A powder blend comprising 100% (weight) of ultrahigh molecular weight polyethylene (UHMWPE) with media particle size of 30 microns (Mistui, Tokyo, Japan) was sintered in an aluminum mold at 360° F. for 3 minutes and cooled to room temperature in 5 minutes. The resulting filters had an average pore size of 10 microns and average pore volume of 38%.

Example 17

The comparative performances for different barrier media products M, N, O, and P from Examples 13 through 16 are shown in Table 4.

Table 4: This table shows results for the blocking properties for deionized (DI) water, isopropanol (IPA), DMSO, methanol, acetone, DMAC, NMP, DMF, acrylonitrile, THF, pyridine, acetic acid, HCl, TFA, butanol, ethanol, dioxane, dimethoxyethane, diethanolamine, formaldehyde, ethylene glycol, sodium hydroxide (NaOH), Tween 20, and SDS.

The results indicate that products M and N (each containing PAA as absorbent), were superior in their blocking properties when compared to products O (CMC as the only absorbent) and P (no absorbent). This was especially evident at higher concentrations of many of the tested solvents.

The new porous plastic self-sealing media showed superior performance compared to currently available commercial products in blocking aqueous solutions of organic solvents. Current self-sealing media could only block aqueous solutions of organic solvents up to an organic solvent concentration of 40%. The organic solvents tested were: methanol, ethanol, isopropanol, butanol, acetone, pyridine, dimethylsulfoxide (DMSO), dimethylformamide (DMF), dimethylacetamide (DMAC), N-Methyl-2-pyrrolidone (NMP), tetrahydrofuran (THF), dioxane, Dimethoxyethane and acetonitrile. The new media could block aqueous solutions of these organic solvents at the concentrations of at least of 60%.

The new porous plastic self-sealing media showed superior performance compared to currently available commercial products in blocking liquid acidic solutions. Currently available self-sealing media could not block acidic aqueous solution with acid concentrations over 5%. The new porous plastic self-sealing media blocked acidic solutions comprised of at least 40% acid. The tested acids were acetic acid, HCl, and trifluoroacetic acid.

| Product | DI water | 20% IPA | 40% IPA | 60% IPA | 80% IPA | 100% IPA |
|---|---|---|---|---|---|---|
| M | Block | Block | Block | Block | Block | Fail |
| N | Block | Block | Block | Block | Block | Fail |

| | | | | | | |
|---|---|---|---|---|---|---|
| O | Block | Block | Block | Fail | Fail | Fail |
| P | Block | Fail | Fail | Fail | Fail | Fail |

| Product | DI water | 20% DMSO | 40% DMSO | 60% DMSO | 80% DMSO | 100% DMSO |
|---|---|---|---|---|---|---|
| M | Block | Block | Block | Block | Block | Fail |
| N | Block | Block | Block | Block | Block | Fail |
| O | Block | Block | Block | Fail | Fail | Fail |
| P | Block | Block | Fail | Fail | Fail | Fail |

| Product | DI water | 20% Methanol | 40% Methanol | 60% Methanol | 80% Methanol | 100% Methanol |
|---|---|---|---|---|---|---|
| M | Block | Block | Block | Block | Block | Block |
| N | Block | Block | Block | Block | Block | Block |
| O | Block | Block | Block | Fail | Fail | Fail |
| P | Block | Fail | Fail | Fail | Fail | Fail |

| Product | DI water | 20% Acetone | 40% Acetone | 60% Acetone | 80% Acetone | 100% Acetone |
|---|---|---|---|---|---|---|
| M | Block | Block | Block | Block | Block | Fail |
| N | Block | Block | Block | Block | Block | Fail |
| O | Block | Block | Block | Fail | Fail | Fail |
| P | Block | Fail | Fail | Fail | Fail | Fail |

| Product | DI water | 20% DMAC | 40% DMAC | 60% DMAC | 80% DMAC | 100% DMAC |
|---|---|---|---|---|---|---|
| M | Block | Block | Block | Block | Block | Fail |
| N | Block | Block | Block | Block | Fail | Fail |
| O | Block | Block | Block | Fail | Fail | Fail |
| P | Block | Fail | Fail | Fail | Fail | Fail |

| Product | DI water | 20% NMP | 40% NMP | 60% NMP | 80% NMP | 100% NMP |
|---|---|---|---|---|---|---|
| M | Block | Block | Block | Block | Block | Fail |
| N | Block | Block | Block | Block | Fail | Fail |
| O | Block | Block | Block | Fail | Fail | Fail |
| P | Block | Fail | Fail | Fail | Fail | Fail |

| Product | DI water | 20% DMF | 40% DMF | 60% DMF | 80% DMF | 100% DMF |
|---|---|---|---|---|---|---|
| M | Block | Block | Block | Block | Block | Fail |
| N | Block | Block | Block | Block | Fail | Fail |
| O | Block | Block | Block | Fail | Fail | Fail |
| P | Block | Fail | Fail | Fail | Fail | Fail |

| Product | DI water | 20% Acrylo-nitrile | 40% Acrylo-nitrile | 60% Acrylo-nitrile | 80% Acrylo-nitrile | 100% Acrylo-nitrile |
|---|---|---|---|---|---|---|
| M | Block | Block | Block | Block | Block | Fail |
| N | Block | Block | Block | Block | Fail | Fail |
| O | Block | Block | Block | Fail | Fail | Fail |
| P | Block | Fail | Fail | Fail | Fail | Fail |

| Product | DI water | 20% THF | 40% THF | 60% THF | 80% THF | 100% THF |
|---|---|---|---|---|---|---|
| M | Block | Block | Block | Block | Block | Fail |
| N | Block | Block | Block | Block | Block | Fail |
| O | Block | Block | Block | Fail | Fail | Fail |
| P | Block | Fail | Fail | Fail | Fail | Fail |

-continued

| Product | DI water | 20% Pyridine | 40% Pyridine | 60% Pyridine | 80% Pyridine | 100% Pyridine |
|---|---|---|---|---|---|---|
| M | Block | Block | Block | Block | Block | Fail |
| N | Block | Block | Block | Block | Fail | Fail |
| O | Block | Block | Block | Fail | Fail | Fail |
| P | Block | Fail | Fail | Fail | Fail | Fail |

| Product | DI water | 20% Acetic Acid | 40% Acetic Acid | 60% Acetic Acid | 80% Acetic Acid | 100% Acetic Acid |
|---|---|---|---|---|---|---|
| M | Block | Block | Block | Block | Block | Fail |
| N | Block | Block | Block | Block | Fail | Fail |
| O | Block | Fail | Fail | Fail | Fail | Fail |
| P | Block | Fail | Fail | Fail | Fail | Fail |

| Product | DI water | 5% HCl | 10% HCl | 20% HCl | 30% HCl | 37% HCl |
|---|---|---|---|---|---|---|
| M | Block | Block | Block | Block | Block | Block |
| N | Block | Block | Block | Block | Block | Block |
| O | Block | Fail | Fail | Fail | Fail | Fail |
| P | Block | Block | Block | Block | Block | Block |

| Product | DI water | 20% TFA | 40% TFA | 60% TFA | 80% TFA | 100% TFA |
|---|---|---|---|---|---|---|
| M | Block | Block | Block | Fail | Fail | Fail |
| N | Block | Block | Block | Fail | Fail | Fail |
| O | Block | Fail | Fail | Fail | Fail | Fail |
| P | Block | Fail | Fail | Fail | Fail | Fail |

| Product | DI water | 20% Butanol | 40% Butanol | 60% Butanol | 80% Butanol | 100% Butanol |
|---|---|---|---|---|---|---|
| M | Block | Block | Block | Block | Block | Fail |
| N | Block | Block | Block | Block | Block | Fail |
| O | Block | Block | Fail | Fail | Fail | Fail |
| P | Block | Fail | Fail | Fail | Fail | Fail |

| Product | DI water | 20% Ethanol | 40% Ethanol | 60% Ethanol | 80% Ethanol | 100% Ethanol |
|---|---|---|---|---|---|---|
| M | Block | Block | Block | Block | Block | Fail |
| N | Block | Block | Block | Block | Block | Fail |
| O | Block | Block | Block | Fail | Fail | Fail |
| P | Block | Fail | Fail | Fail | Fail | Fail |

| Product | DI water | 20% Dioxane | 40% Dioxane | 60% Dioxane | 80% Dioxane | 100% Dioxane |
|---|---|---|---|---|---|---|
| M | Block | Block | Block | Block | Block | Fail |
| N | Block | Block | Block | Block | Fail | Fail |
| O | Block | Block | Block | Fail | Fail | Fail |
| P | Block | Fail | Fail | Fail | Fail | Fail |

| Product | DI water | 20% Dimethoxyethane | 40% Dimethoxyethane | 60% Dimethoxyethane | 80% Dimethoxyethane | 100% Dimethoxyethane |
|---|---|---|---|---|---|---|
| M | Block | Block | Block | Block | Block | Fail |
| N | Block | Block | Block | Block | Block | Fail |
| O | Block | Block | Block | Fail | Fail | Fail |
| P | Block | Fail | Fail | Fail | Fail | Fail |

| Product | DI water | 20% Diethanolamine | 40% Diethanolamine | 60% Diethanolamine | 80% Diethanolamine | 100% Diethanolamine |
|---|---|---|---|---|---|---|
| M | Block | Block | Block | Block | Block | Block |
| N | Block | Block | Block | Block | Block | Block |
| O | Block | Block | Block | Block | Block | Block |
| P | Block | Block | Block | Block | Block | Block |

| Product | DI water | 5% Formaldehyde | 10% Formaldehyde | 20% Formaldehyde | 30% Formaldehyde | 37% Formaldehyde |
|---|---|---|---|---|---|---|
| M | Block | Block | Block | Block | Block | Block |
| N | Block | Block | Block | Block | Block | Block |
| O | Block | Block | Block | Block | Block | Block |
| P | Block | Block | Block | Fail | Fail | Fail |

| Product | DI water | 20% Glycerol | 40% Glycerol | 60% Glycerol | 80% Glycerol | 100% Glycerol |
|---|---|---|---|---|---|---|
| M | Block | Block | Block | Block | Block | Block |
| N | Block | Block | Block | Block | Block | Block |
| O | Block | Block | Block | Block | Block | Block |
| P | Block | Block | Block | Block | Block | Block |

| Product | DI water | 20% Ethylene Glycol | 40% Ethylene Glycol | 60% Ethylene Glycol | 80% Ethylene Glycol | 100% Ethylene Glycol |
|---|---|---|---|---|---|---|
| M | Block | Block | Block | Block | Block | Block |
| N | Block | Block | Block | Block | Block | Block |
| O | Block | Block | Block | Block | Fail | Fail |
| P | Block | Block | Block | Fail | Fail | Fail |

| Product | DI water | 5% NaOH | 10% NaOH | 20% NaOH | 30% NaOH | 50% NaOH |
|---|---|---|---|---|---|---|
| M | Block | Block | Block | Block | Block | Block |
| N | Block | Block | Block | Block | Block | Block |
| O | Block | Block | Block | Block | Block | Block |
| P | Block | Block | Block | Block | Block | Block |

| Product | DI water | 0.01% Tween 20 | 0.1% Tween 20 | 0.5% Tween 20 | 1% Tween 20 | 2% Tween 20 |
|---|---|---|---|---|---|---|
| M | Block | Block | Block | Block | Block | Block |
| N | Block | Block | Block | Block | Block | Block |
| O | Block | Block | Block | Block | Block | Block |
| P | Block | Block | Block | Fail | Fail | Fail |

| Product | DI water | 0.01% SDS | 0.1% SDS | 0.5% SDS | 1% SDS | 2% SDS |
|---|---|---|---|---|---|---|
| M | Block | Block | Block | Block | Block | Block |
| N | Block | Block | Block | Block | Block | Block |
| O | Block | Block | Block | Block | Block | Block |
| P | Block | Block | Block | Fail | Fail | Fail |

All patents, publications and abstracts cited above are incorporated herein by reference in their entirety. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention as defined in the following claims.

The invention claimed is:

1. A layered structure, comprising:
   (a) a first layer comprising a porous self-sealing composition comprising a sintered porous matrix of particles of an absorbent material and particles of a thermoplastic, wherein the absorbent material comprises polyacrylic acid, and the polyacrylic acid is linear polyacrylic acid with a molecular weight greater than 100 KDa or cross-linked polyacrylic acid with a linear backbone molecular weight between adjacent crosslinks (Mc) greater than 10 KDa and
   (b) a second layer comprising a sintered porous thermoplastic layer without a self-sealing agent.

2. The structure of claim 1, wherein the absorbent material in the sintered porous matrix is from about 1% to about 45%, from about 3% to about 40%, from about 5% to about 35%, or from about 10% to about 30%, by weight of the sintered porous matrix.

3. The structure of claim 1, wherein the sintered porous matrix has a porosity of from about 10% to about 70%, from about 20% to about 60%, or from about 30% to about 50%.

4. The structure of claim 1, wherein the sintered porous matrix has an average pore size of from about 1 micron to about 200 microns, from about 5 microns to about 100 microns, or from about 10 microns to about 50 microns.

5. The structure of claim 1, wherein the cross-linked polyacrylic acid has a cross-linking density of less than about 0.5%, less than about 0.2% or less than about 0.1%.

6. The structure of claim 1, wherein the thermoplastic particles are selected from the group consisting of polyethylene, polypropylene and polyvinylidene fluoride (PVDF).

7. The structure of claim 6, wherein the polyethylene is high density polyethylene (HDPE), low density polyethylene (LDPE), very high molecular weight polyethylene (VHMWPE), or ultrahigh molecular weight polyethylene (UHMWPE).

8. The structure of claim 1, further comprising a thermoplastic elastomer or a color change indicator.

9. The structure of claim 1, further comprising an absorbent material, CMC or a superabsorbent material.

10. A device comprising the structure of claim 1.

11. The device of claim 10, wherein the device is a pipette tip, an in line filter, a vent, a valve, a container, a non-mechanical check valve, a safety valve, a syringe cap, or a suction canister.

12. A method of blocking the passage of a solution comprising: contacting the structure of claim 1 with the solution; and, permitting the composition to absorb the solution and seal, whereby passage of the solution is blocked by the composition.

13. The method of claim 12, wherein the solution comprises an organic solvent or an aqueous solution of more than 40% of an organic solvent.

14. The method of claim 12, wherein the solution comprises more than 5% of an inorganic acid or more than 5% of an organic acid.

15. The method of claim 12, wherein the contacting step occurs at about 2 psi.

16. The method of claim 12, wherein the solution further comprises a surfactant.

17. The structure of claim 1, wherein the first layer further comprises a color change indicator.

18. A layered structure, comprising:
a first layer comprising a porous self-sealing composition comprising a sintered porous matrix of particles of an absorbent material and particles of a thermoplastic, wherein the absorbent material comprises polyacrylic acid, and the polyacrylic acid is linear polyacrylic acid with a molecular weight greater than 100 KDa or crosslinked polyacrylic acid with a linear backbone molecular weight between adjacent crosslinks (Mc) greater than 10 KDa, wherein the layer is sandwiched between second and third layers that comprise a sintered porous thermoplastic layer without a self-sealing agent.

19. The structure of claim 18, wherein the first layer further comprises a color change indicator.

20. The structure of claim 18, wherein the second and third layers comprise sintered porous plastic polyethylene.

21. A device comprising the structure of claim 18.

22. The device of claim 21, wherein the device is a pipette tip, an in line filter, a vent, a valve, a container, a non-mechanical check valve, a safety valve, a syringe cap, or a suction canister.

* * * * *